(12) United States Patent
Huang et al.

(10) Patent No.: US 10,799,966 B2
(45) Date of Patent: Oct. 13, 2020

(54) ROTATIONAL SAW BOW DEVICE WITHOUT ROTARY AXIS AND SAWING MACHINE

(71) Applicant: COSEN MECHATRONICS CO., LTD., Hsinchu (TW)

(72) Inventors: Mu-Shui Huang, Hsinchu (TW); Yong-Run Peng, Hsinchu (TW); Shih-Yu Chiang, Hsinchu (TW)

(73) Assignee: COSEN MECHATRONICS CO., LTD., Hsinchu (TW)

( * ) Notice: Subject to any disclaimer, the term of this patent is extended or adjusted under 35 U.S.C. 154(b) by 0 days.

(21) Appl. No.: 16/199,301

(22) Filed: Nov. 26, 2018

(65) Prior Publication Data

US 2019/0176251 A1   Jun. 13, 2019

(30) Foreign Application Priority Data

Dec. 8, 2017   (TW) .............................. 106143234 A

(51) Int. Cl.
*B23D 53/02* (2006.01)
*B23D 55/02* (2006.01)
*F16H 55/26* (2006.01)

(52) U.S. Cl.
CPC .......... *B23D 53/023* (2013.01); *B23D 55/02* (2013.01); *F16H 55/26* (2013.01)

(58) Field of Classification Search
CPC ...... B23D 53/23; B23D 53/023; B23D 55/02; B23D 53/04; B23D 53/045; B23D 53/00; B23D 53/02; Y10T 83/7208; F16C 29/04; F16C 29/0626; F16C 29/0673; F16C 29/065; F16H 55/26

USPC .............................. 83/811; 384/44, 46, 50, 52
See application file for complete search history.

(56) References Cited

U.S. PATENT DOCUMENTS

| | | | | |
|---|---|---|---|---|
| 130,618 | A * | 8/1872 | Blass | B23D 47/025 83/432 |
| 442,420 | A * | 12/1890 | Coan | B23D 53/023 83/812 |
| 490,212 | A * | 1/1893 | O'Connor | B23D 53/023 83/812 |
| 797,321 | A * | 8/1905 | Rishebarger | B23D 53/023 83/811 |
| 798,519 | A * | 8/1905 | Manning | B23D 53/023 83/811 |
| 814,652 | A * | 3/1906 | Harrold et al. | B23D 53/023 83/811 |
| 1,296,488 | A * | 3/1919 | Laney | B23D 47/025 83/432 |
| 3,739,679 | A * | 6/1973 | Schwend | B23D 53/04 83/789 |

(Continued)

*Primary Examiner* — Evan H MacFarlane
(74) *Attorney, Agent, or Firm* — WPAT, PC

(57) ABSTRACT

A rotational saw bow device without a rotary axis includes a saw bow seat, a fixed portion and a rotating device. The fixed portion is connected to the saw bow seat. The rotating device is disposed between the saw bow seat and the fixed portion, and the rotating device includes a driving component, an angle adjustment portion, a trajectory portion and a rotating mechanism. The driving component drives a gear wheel portion to rotate on the angle adjustment portion, so that the rotating mechanism moves along the trajectory portion to rotate the saw bow seat. In addition, a sawing machine includes the rotational saw bow device.

12 Claims, 12 Drawing Sheets

(56) References Cited

U.S. PATENT DOCUMENTS

| | | | | |
|---|---|---|---|---|
| 4,111,085 A * | 9/1978 | Johnson | ................. | B23D 53/04 |
| | | | | 83/801 |
| 4,882,962 A * | 11/1989 | Terpstra | ............... | B23D 53/023 |
| | | | | 83/812 |
| 4,909,108 A * | 3/1990 | Nakada | ................ | B23D 53/045 |
| | | | | 83/699.51 |
| 7,185,407 B2 * | 3/2007 | Boyl-Davis | ............ | B23Q 5/385 |
| | | | | 105/144 |
| 2003/0209124 A1 * | 11/2003 | Chiang | ............... | B23D 53/023 |
| | | | | 83/809 |
| 2007/0020065 A1 * | 1/2007 | Kirby | .................... | B23Q 1/035 |
| | | | | 414/1 |
| 2019/0232977 A1 * | 8/2019 | Aoki | .................... | H02K 41/031 |

* cited by examiner

ROTATIONAL SAW BOW DEVICE WITHOUT ROTARY AXIS AND SAWING MACHINE

CROSS REFERENCE TO RELATED APPLICATION

This application also claims priority to Taiwan Patent Application No. 106143234 filed in the Taiwan Patent Office on Dec. 8, 2017, the entire content of which is incorporated herein by reference.

FIELD OF THE INVENTION

The present invention relates to a saw bow device and the sawing machine using the same, and more particularly, to a rotational saw now device without rotary axis and a vacuum-holding sawing machine using the same.

BACKGROUND OF THE INVENTION

Conventionally, a saw bow in a band saw machine is connected to a main wheel and a transmission wheel while enabling its band saw blade to be mounted by winding itself around the radially outer edges of both the main wheel and the transmission wheel, by that the rotating main wheel is able to bring along the band saw blade to move for performing a saw cutting operation as a work piece is fixedly stationed by the use of a C-clamp.

Generally, any cutting pattern variation in a saw cutting operation is achieved by varying the movement of the saw bow while the saw blade is enabled to cut the work piece in a perpendicular direction. However, if it is intended to have an oblique cutting surface, conventionally it is achieved simply by tilting the saw bow to a desired angle while enabling the saw bow to move for performing a saw cutting operation. Moreover, as the currently available mechanism for fixing a work piece is generally achieved by the use of C-clamps, the work piece that is made of soft materials can be deformed by the clamping force from the C-clamps.

Due to the aforesaid shortages that an oblique cutting surface can not be achieved effortlessly by the use of any current saw cutting machine without adjusting its saw bow inclination, and also the conventional C-clamp fixing mechanism used in the current saw cutting machine can only be applied to work pieces of harder materials. Therefore, it is in need of an improved saw bow device and the sawing machine using the same.

SUMMARY OF THE INVENTION

In view of the disadvantages of prior art, the primary object of the present invention is to provide a rotational saw now device without rotary axis and a sawing machine using the same. By the use of the foregoing rotational saw now device, a saw bow seat is enabled to rotate by a specific angle with respect to a feed mechanism and then is to be fixed, and then the feed mechanism is enabled to feed a work piece to the saw bow seat for allowing the work piece to be cut by the saw blade so as to form an oblique surface of the specific angle on the work piece.

In the present invention, a rotational saw bow device without rotary axis is provided, which includes a saw bow seat, a fixed portion and a rotating device. The fixed portion is connected to the saw bow seat. The rotating device is disposed between the saw bow seat and the fixed portion, and the rotating device includes a driving component, an angle adjustment portion, a trajectory portion and at least one rotating mechanism. The driving component further includes a gear wheel portion that is arranged mating to the angle adjustment portion. The driving component drives the gear wheel portion to rotate on the angle adjustment portion, so that the rotating mechanism is enabled to move following the guiding of the trajectory portion so as to bring along the saw bow seat to rotate accordingly.

In the present invention, a sawing machine for cutting a workpiece is provided, which includes a feed mechanism, a vacuum holding device and the aforesaid rotational saw bow device. The feed mechanism is provided for feeding the work piece. The vacuum holding device is connected to the feed mechanism to be used for holding the work piece. The rotational saw bow device is connected to the feed mechanism. Thereby, the driving component drives the gear wheel portion to rotate while mating to the angle adjustment portion, so that the sawing machine is enabled to move following the guiding of the trajectory portion while bringing along the saw bow seat to rotate by a specific angle with respect to the feed mechanism as the feed mechanism is enabled to feed the work piece to the saw bow seat.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
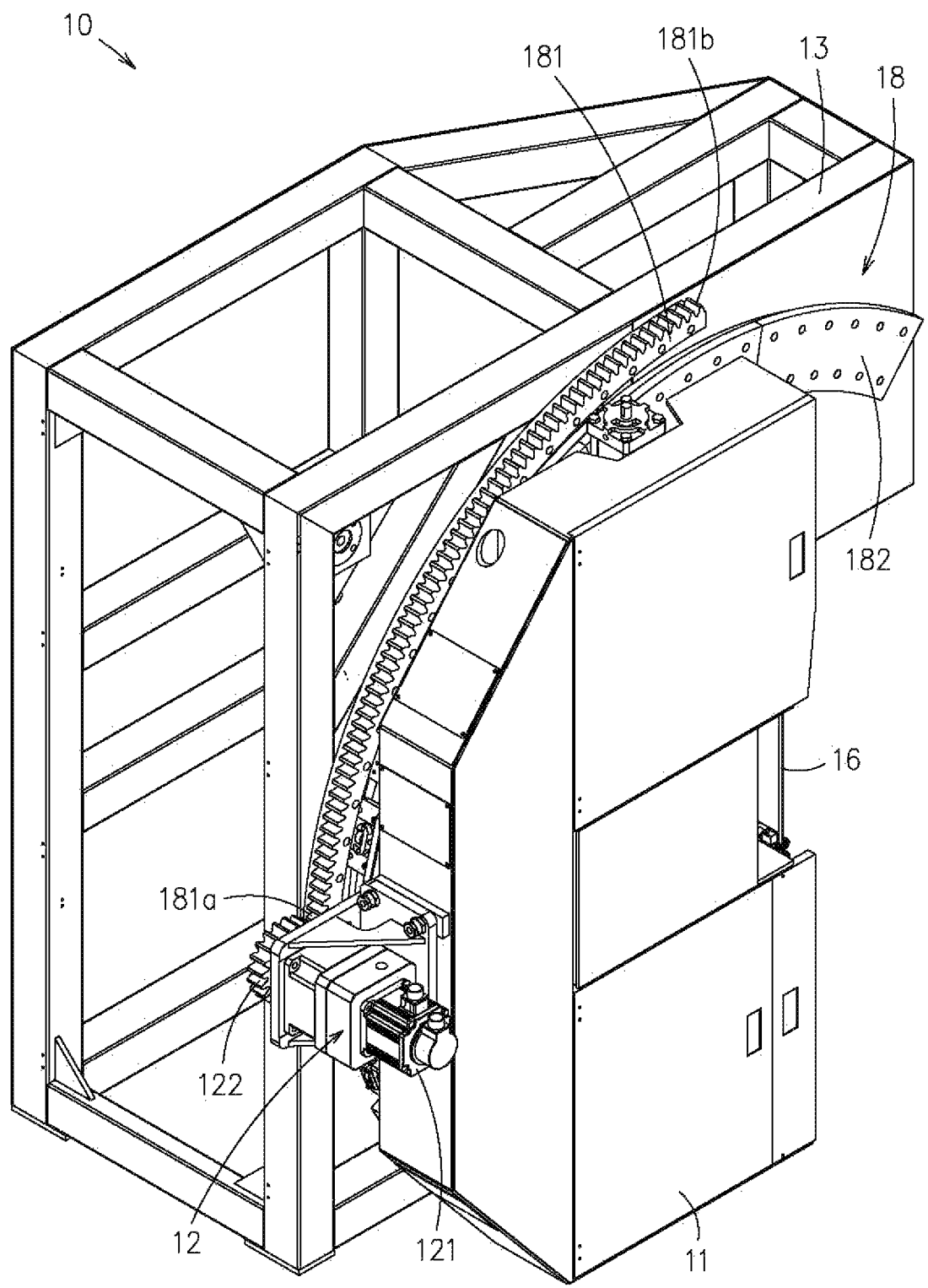
FIG. 1 is a schematic diagram showing a rotational saw bow device without rotary axis according to an embodiment of the present invention.
Figure 2:
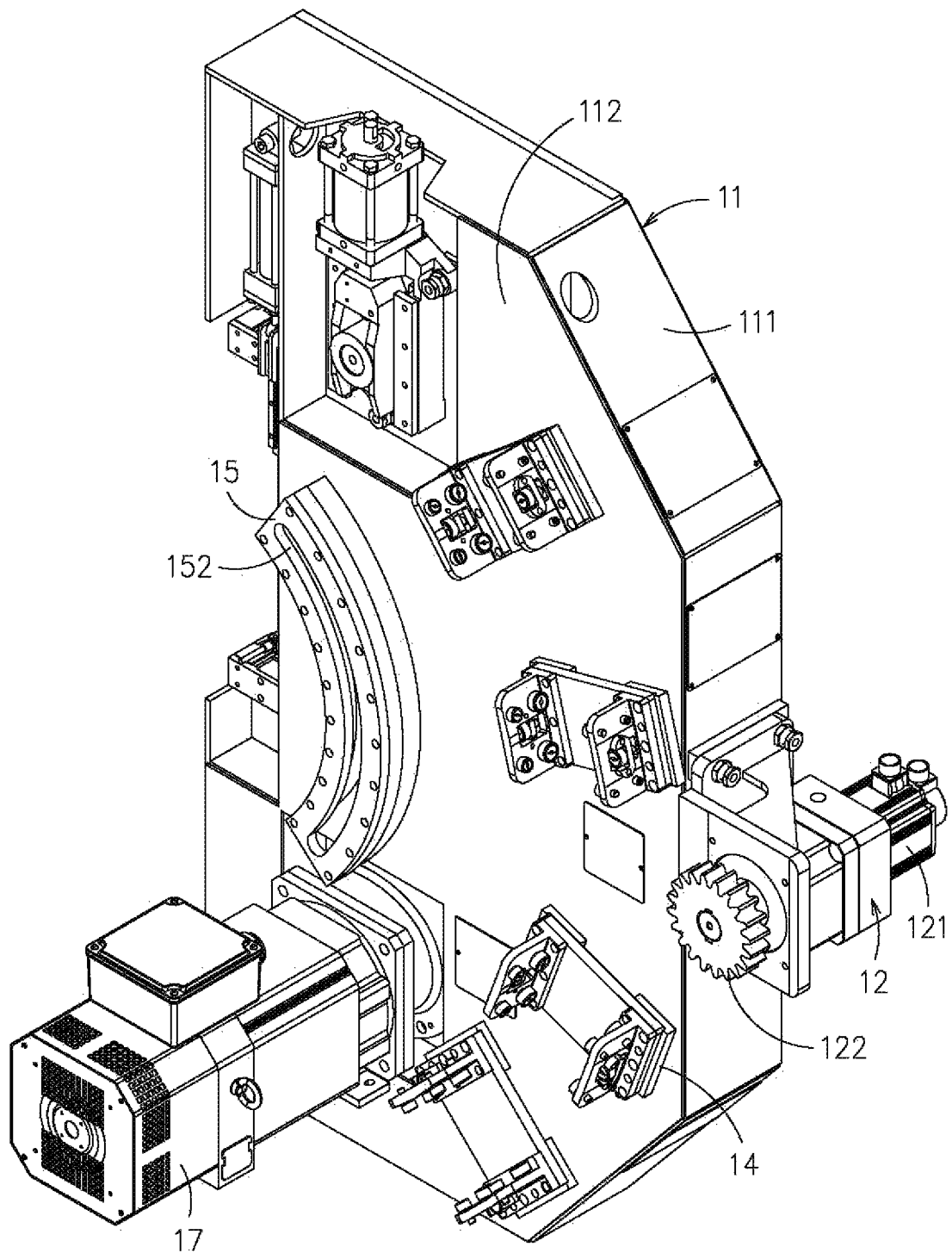
FIG. 2 is a schematic diagram showing a saw bow of FIG. 1.
Figure 3:
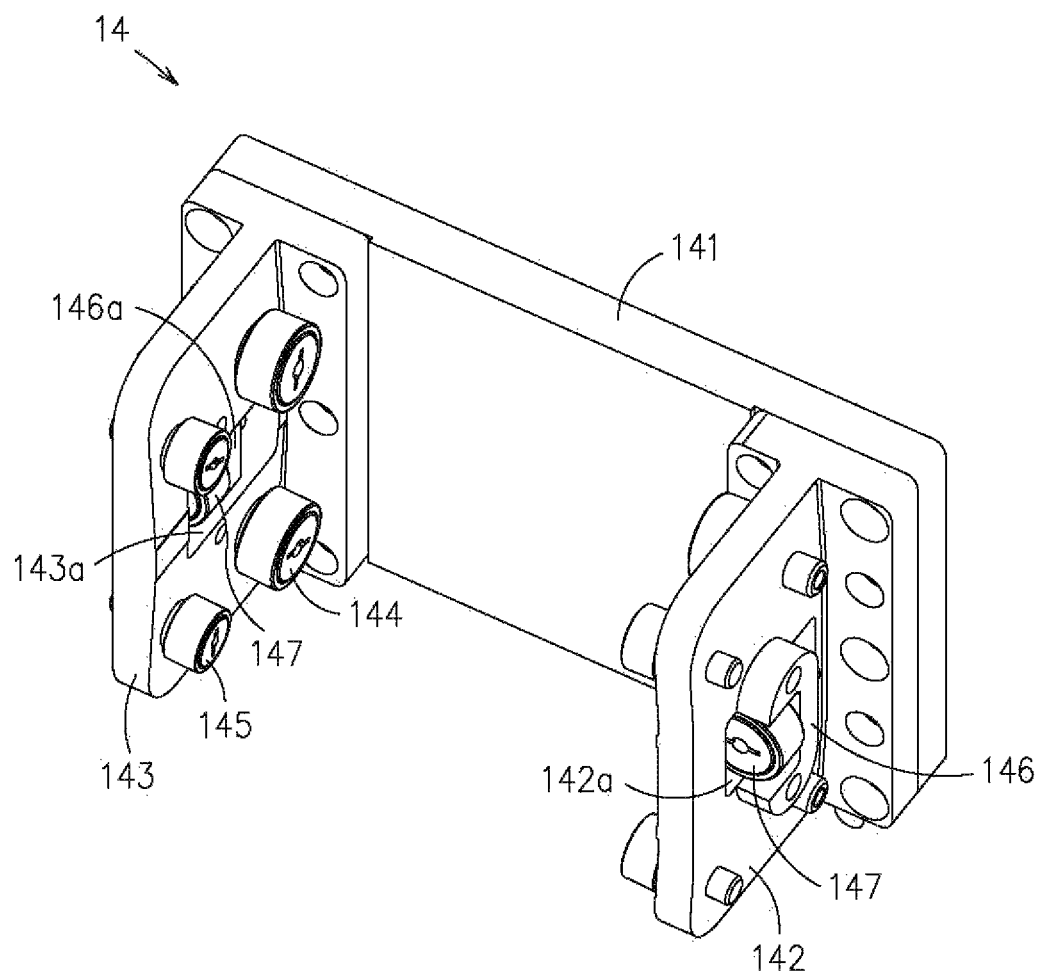
FIG. 3 is a schematic diagram showing a rotating mechanism of FIG. 1.
Figure 4:
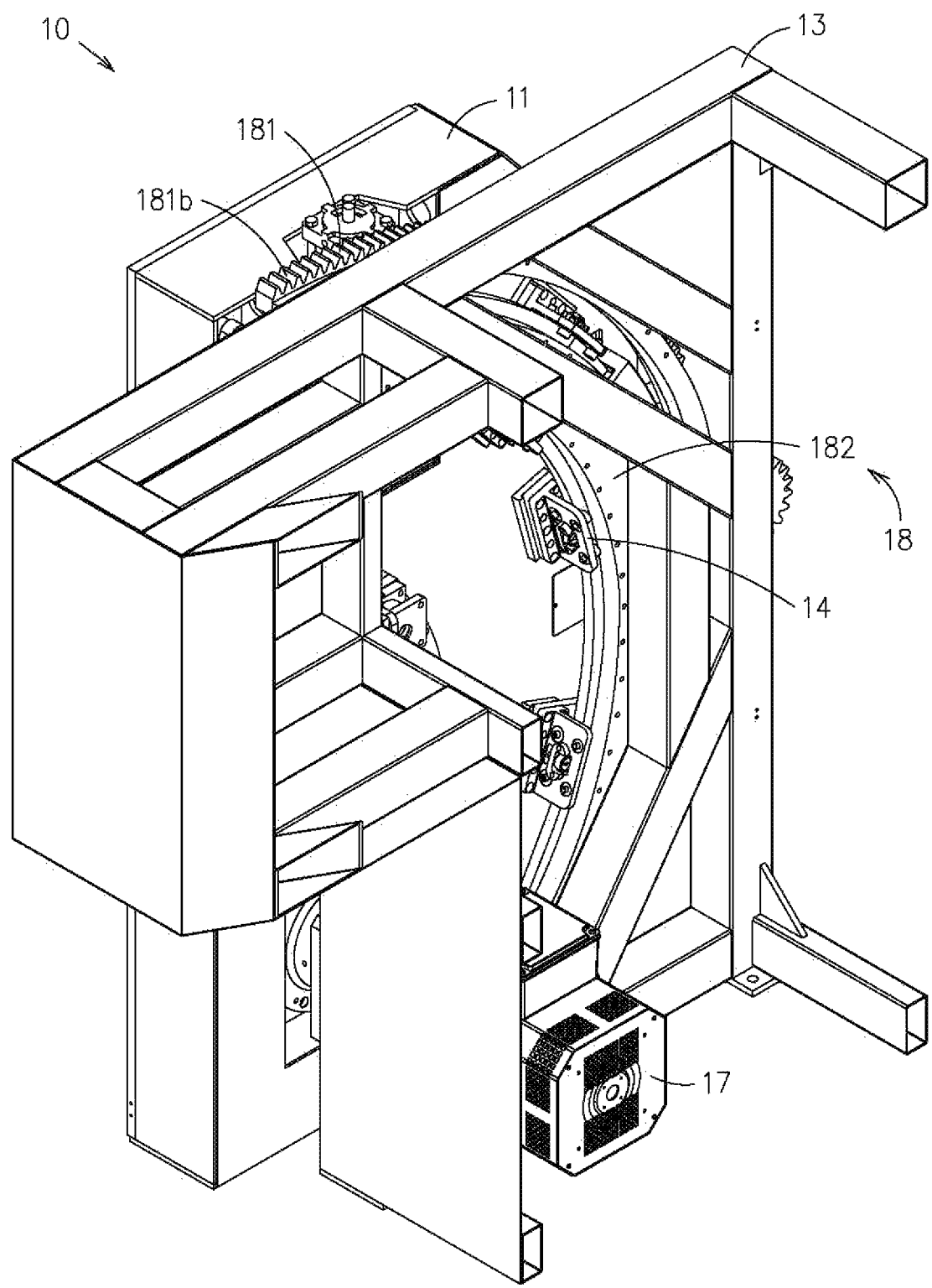
FIG. 4 is a schematic diagram showing a rotational saw bow device of FIG. 1 in another viewing angle.
Figure 5:
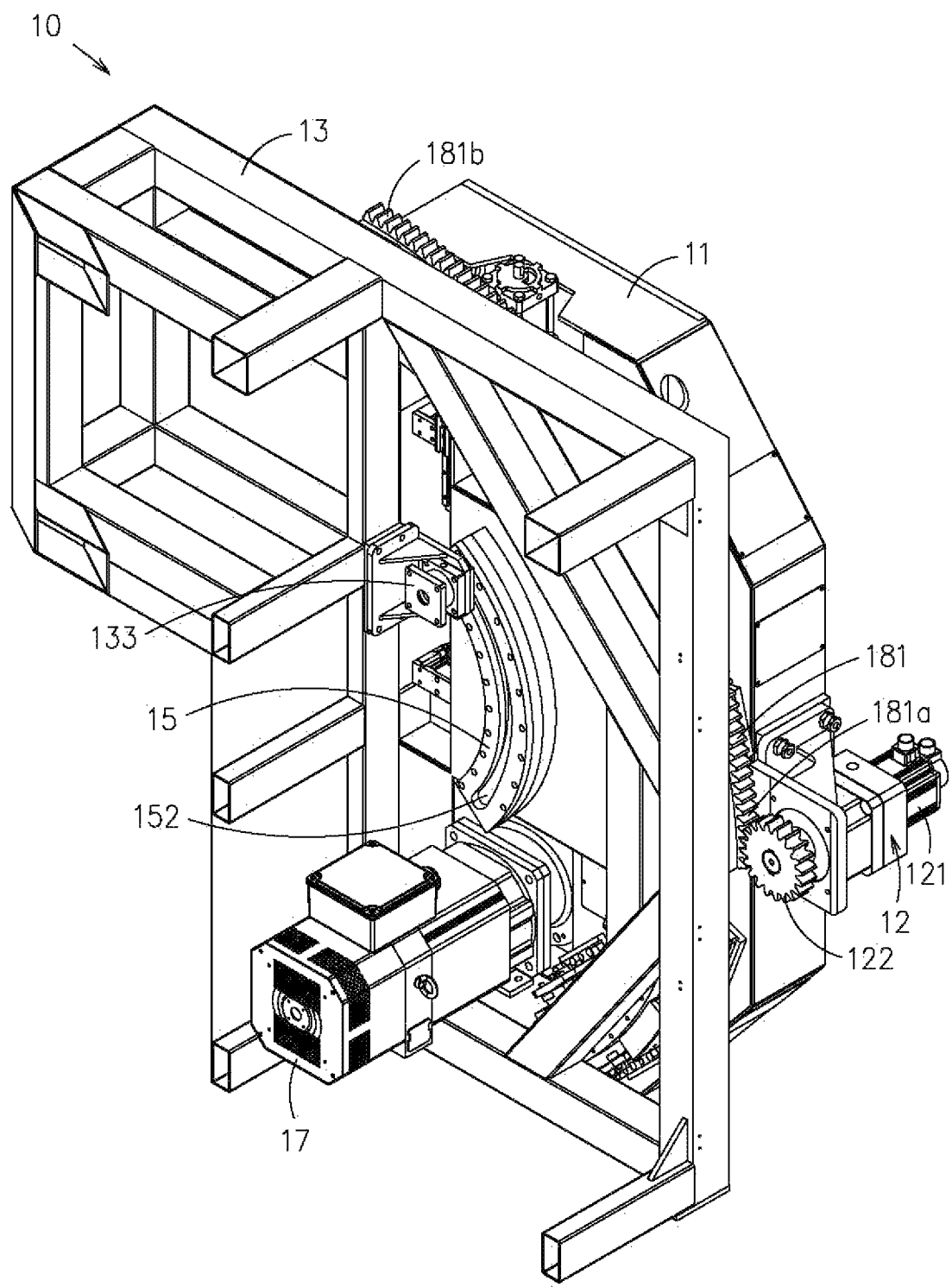
FIG. 5 is a schematic diagram showing a rotational saw bow device of FIG. 1 in further another viewing angle.
Figure 6:
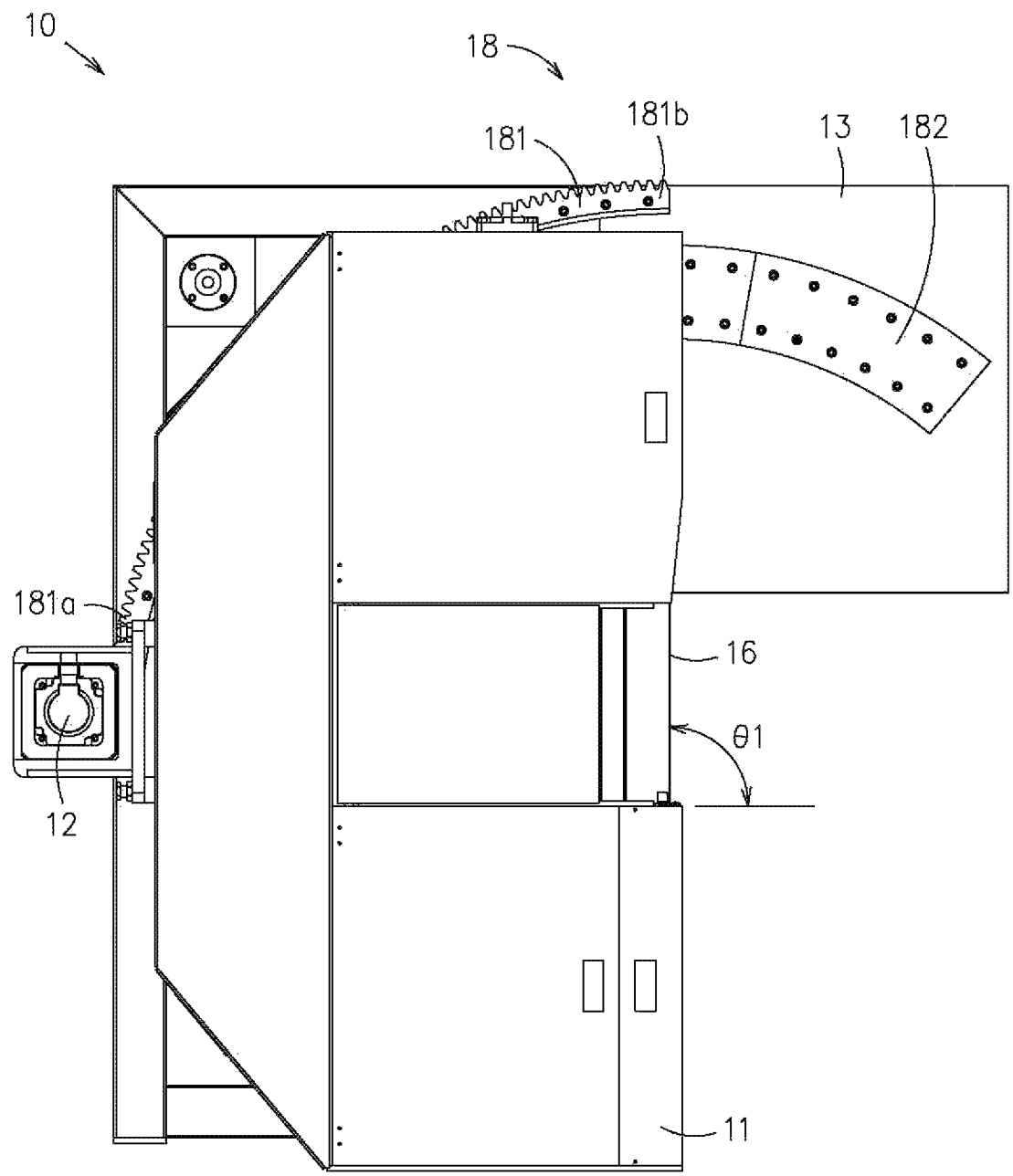
FIG. 6 is a schematic diagram showing a rotational saw bow device of FIG. 1 as the saw blade is arranged to form a first angle with respect to ground level.
Figure 7:
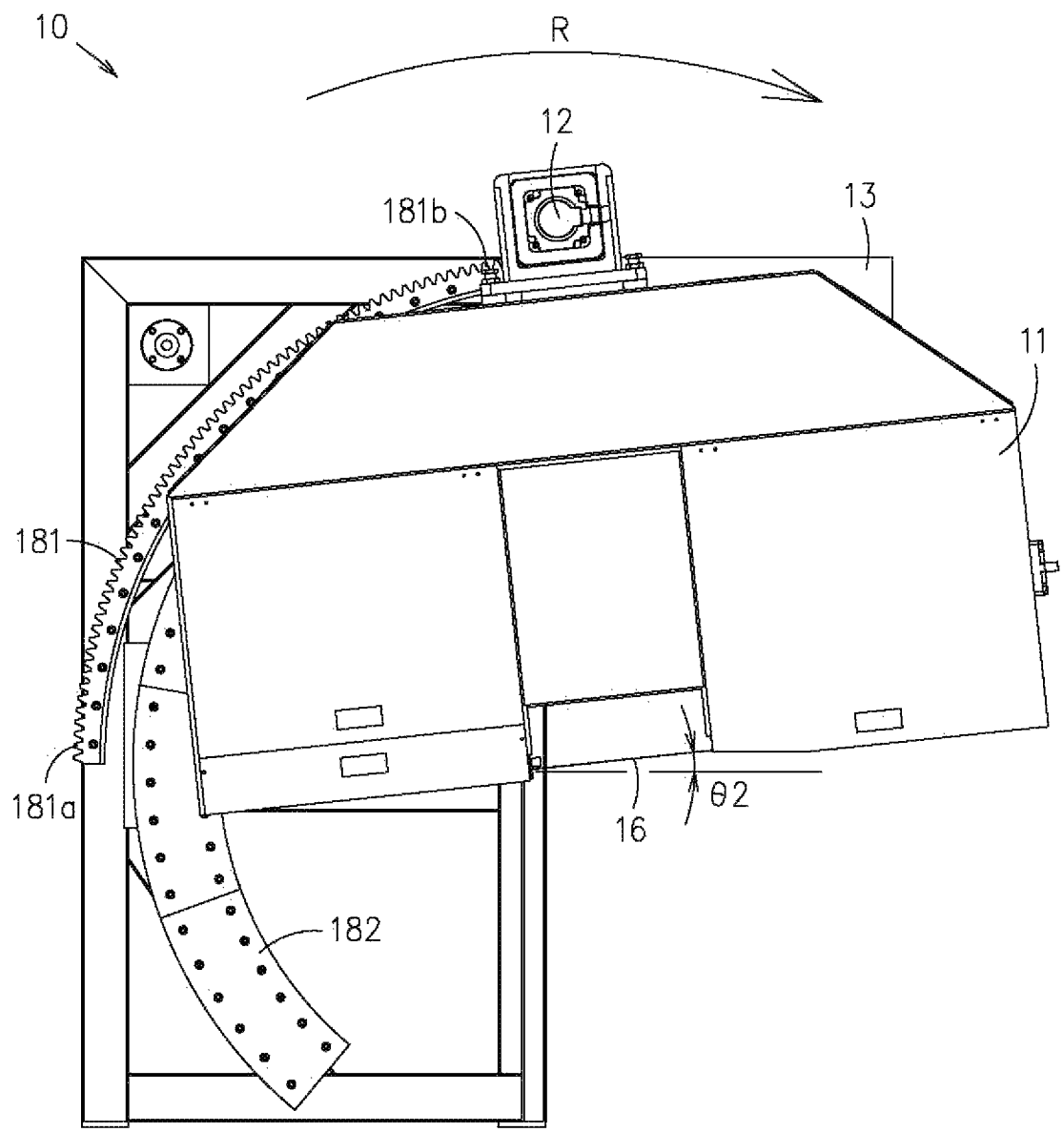
FIG. 7 is a schematic diagram showing a rotational saw bow device of FIG. 1 as the saw blade is arranged to form a second angle with respect to ground level.

FIG. 1 is a schematic diagram showing a rotational saw bow device without rotary axis according to an embodiment of the present invention. FIG. 2 is a schematic diagram showing a saw bow of FIG. 1. FIG. 3 is a schematic diagram showing a rotating mechanism of FIG. 1. FIG. 4 is a schematic diagram showing a rotational saw bow device of FIG. 1 in another viewing angle. FIG. 5 is a schematic diagram showing a rotational saw bow device of FIG. 1 in further another viewing angle. FIG. 6 is a schematic diagram showing a rotational saw bow device of FIG. 1 as the saw blade is arranged to form a first angle with respect to ground level. FIG. 7 is a schematic diagram showing a rotational saw bow device of FIG. 1 as the saw blade is arranged to form a second angle with respect to ground level. As shown in FIG. 1 and FIG. 2, a rotational saw bow device without rotary axis 10 is disclosed, which comprises: a saw bow seat 11, a fixed portion 13, a saw blade 16, a driving component 17 and rotating device 18.

In this embodiment, the saw bow seat 11 has a main wheel and a transmission wheel to be disposed therein while allowing the saw blade 16 to be mounted by winding itself around the radially outer edges of both the main wheel and the transmission wheel. Moreover, the back panel 112 of the saw bow seat 11 is connected to the driving component 17 while allowing the main wheel to be driven to rotate by the driving component 17 so as to bring along the saw blade 16 to move accordingly. It is noted that the driving component 17 can be composed of a motor and a reducer. In addition, there is a sliding component 15 to be disposed at the bottom of the back panel 112 of the saw bow seat 11, which is composed of a sliding rail 152; and further there is at least one rotating mechanism 14 that is disposed at the top of the back panel 112 of the saw bow seat 11. As shown in FIG. 2, there are four rotating mechanisms 14. However, the amount of the rotating mechanism 14 is not limited thereby and thus can be adjusted according to actual requirement. In FIG. 4, the four rotating mechanisms 14 are alternatively arranged on the back panel 112 into an arc-shaped moving trajectory.

In the embodiment shown in FIG. 3, each rotating mechanism 14 is composed of a bottom plate 141, an outer mounting panel 142, an inner mounting panel 143, a plurality of first follower bearings 144, a plurality of second follower bearings 145, a side fixing part 146, and a plurality of third follower bearings 147. The bottom plate 141 is fixed on the back panel 112 of the saw bow seat 11, as shown in FIG. 2; and the outer mounting panel 142 and the inner mounting panel 143 are fixed respectively to the two opposing sides of the bottom plate 141 while enabling the outer mounting panel 142 and the inner mounting panel 143 to be spaced from each other by an interval. In addition, there are two first follower bearings 144 to be disposed at an end of the inner mounting panel 143 that are arranged neighboring to the bottom plate 141, whereas there are two second follower bearings 145 to be disposed at another end of the inner mounting panel 143 that are arranged away from the bottom plate 141, In this embodiment, the rotation shafts of the first follower bearings 144 are arranged parallel to rotation shafts of the second follower bearings 145, and bearing diameter of each first follower bearing 144 is larger than that of each second follower bearing 145. Moreover, the inner mounting panel 143 is has a slot 143a to be formed thereon, whereas the two first follower bearings 144 and the two second follower bearings 145 are located at the periphery of the slot 143a. The side fixing part 146 and the third follower bearing 147 are arranged respectively inside the slot 143a in a manner that an end of the third follower bearing 147 is coupled to a insetting component 146a of the side fixing part 146 for enabling the third follower bearing 147 to rotate. In addition, the third follower bearing 147 is arranged protruding out the slot 143 and is fixed by the use of the side fixing part 146; and the rotation shafts of the third follower bearings 147 are arranged perpendicular to rotation shafts of the first follower bearing 144 or the second follower bearings 145. Similarly, the outer mounting panel 142 is arranged similar to that of the inner mounting panel 143 that there are also two first follower bearings 144 and two second follower bearings 145 to be disposed on the outer mounting panel 142 while allowing another side fixing part 146 and another third following bearing 147 to be arranged inside the slot 142a of the outer mounting panel 142. According to the aforesaid configuration, the rotating mechanism of this embodiment includes the first follower bearings 144, the second follower bearings 145 and the third follower bearings 147, but it is not limited thereby and thus can be different amount of follower bearings to be arranged at different positions in the rotating mechanism according to other embodiments of the present invention.

In this embodiment, the rotating device 18 is arranged at a position between the saw bow seat 11 and the fixed portion 13, and is comprised of a driving component 12, an angle adjustment portion 181, a trajectory portion 182 and at least one rotating mechanism 14. The driving component 12 is connected to a side plate 111 of the saw bow seat 11 and is composed of a motor 121 and a gear wheel portion 122 in a manner that the motor 121 is coupled to the gear wheel portion 122 for allowing the motor 121 to drive the gear wheel portion 122 to rotate. The fixed portion 13 that is connected to the saw bow seat 11 is composed of a driver 133. The angle adjustment portion 181 which is an arc-shaped part is formed with a first position 181a and a second position 181b while enabling a plurality of protrusions and a plurality of recesses to be formed at the positions between the first position 181a and the second position 181b, by that the rotating gear wheel portion 122 can engage and fit into the recesses of the angle adjustment portion 181 between the first position 181a and the second position 181b so as to achieve an angular adjustment operation. In this embodiment, the angle adjustment portion 181 can be a rack. In addition, the trajectory portion 182 can be an arc-shaped part, whereby there are at least one rotating mechanism to be arranged at different positions of the arc-shaped trajectory portion 182, and each such rotating mechanism can be composed of the first follower bearings 144, the second follower bearings 145 and the third follower bearings 147, as described in the aforesaid embodiment. In this embodiment, the first follower bearings 144 are arranged engaging to the top surface of the trajectory portion 182 and the second follower bearings 145 are arranged engaging to the bottom surface of the trajectory portion 182, while allowing the left and right edges of the trajectory portion 182 to engage respectively to the two third follower bearings 147. Thereby, the first follower bearings 144, the second follower bearings 145 and the third follower bearings 147 are arranged for allowing them to slide on the trajectory portion 182, so that the rotating mechanism 14 of the saw bow seat 11 is able to move following the guiding of the trajectory portion 182. Moreover, the driver 133 is used for controlling a locking member for enabling the lock to engage to the sliding rail 152 of the sliding component 15 so as to lock the saw bow seat 11. It is noted that the driver 133 can be a hydraulic cylinder and the locking member can be a locking block.

Using the aforesaid configuration, when the gear wheel portion 122 is being driven to rotate by the motor 121, the gear wheel portion 122 is being enabled to rotate on the angle adjustment portion 181 so as to enable each rotating mechanism 14 to move following the guiding of the trajectory portion 182, while the same time the driver 133 is used for controlling the locking member to engage with the sliding rail 152 of the sliding component 15 for locking the saw bow seat, and thus bringing along the saw bow seat 11 to rotate accordingly. When the gear wheel portion 122 is enabled to mate to the first position 181a of the angle adjustment portion 181, the saw blade 16 is positioned to tilted by a first angle $\theta_1$. As shown in FIG. 6, the first angle $\theta_1$ can be a 90-degree angle with respect to the ground level. On the other hand, when the gear wheel portion 122 is enabled to mate to the second position 181b of the angle adjustment portion 181, the saw blade 16 is positioned to tilted by a second angle $\theta_2$. As shown in FIG. 7, the second angle $\theta_2$ can be a 6-degree angle with respect to the ground level. Therefore, by enabling the saw bow seat 11 of the present embodiment to rotate following a rotation direction R, the saw blade 16 is enabled to tilt by an angle as required. Moreover, in the present embodiment as saw bow seat 11 is rotated according to the moving of the rotating mechanisms 14 on the trajectory portion 182 that the saw bow seat 11 in the present invention is not rotated about its rotation axis, the issue relating the overburdening on the axis can be prevented. In addition, since the first follower bearings 144, the second follower bearings 145 and the third follower bearings 147 are enabled to slide on the trajectory portion 182 respectively when the rotating mechanisms are enabled to move on the trajectory portion 182, the smoothness for enabling the saw bow seat 11 to rotate is enhanced.

Figure 8:
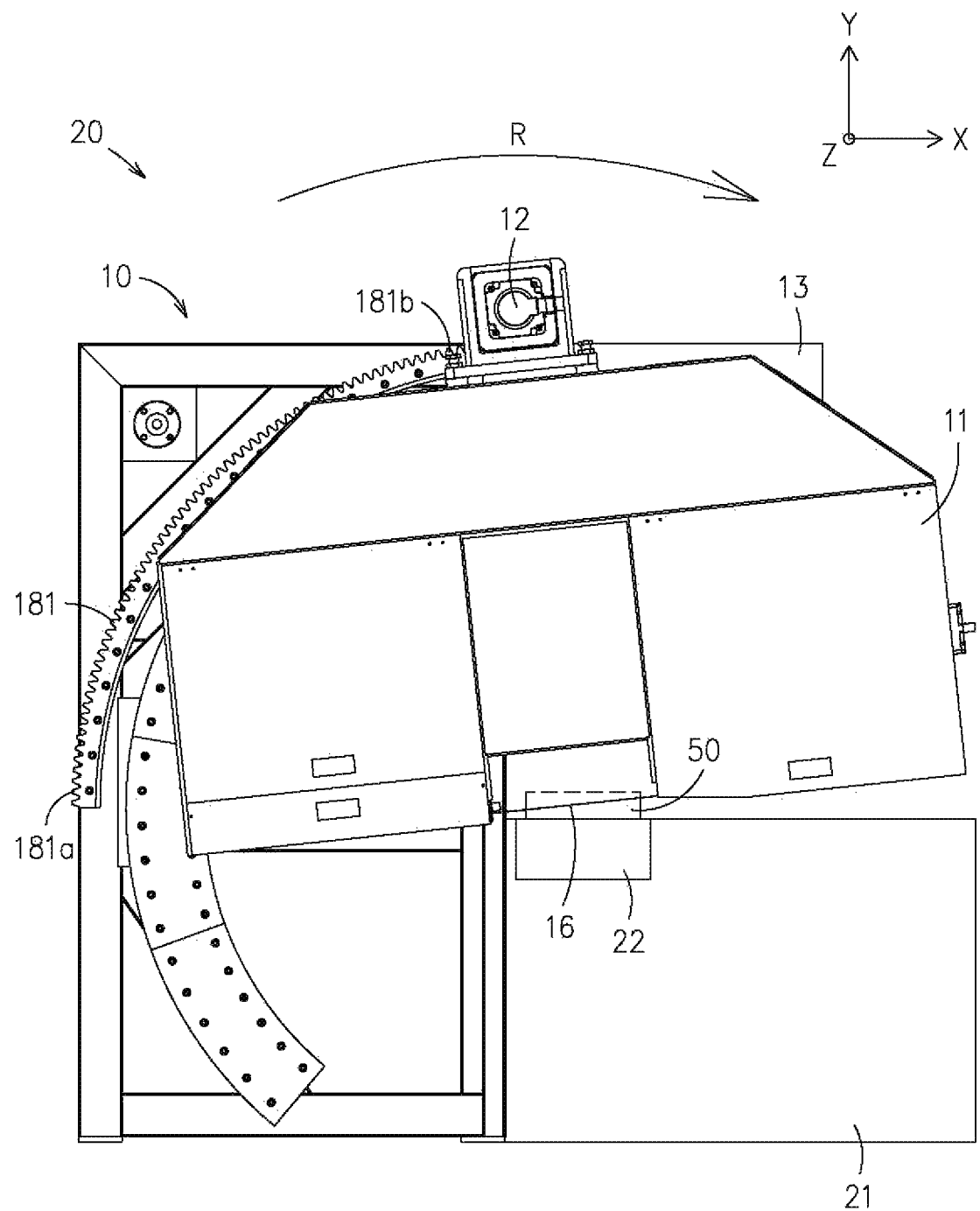
FIG. 8 is a planar diagram showing a sawing machine according to an embodiment of the present invention.

FIG. 8 is a planar diagram showing a sawing machine according to an embodiment of the present invention. As shown in FIG. 8, an XYZ-axis coordinate system is used, in which X is the axis that goes side to side, Y is up to down and Z is forward to backward, as the three axes are perpendicular to one another. In the present invention, a saw machine 20 is disclosed that it can be used for cutting a work piece 50 made of whichever materials. In an embodiment, the work piece 50 is made of a soft material; in another embodiment, the work piece 50 is made of a light-weight material; or further in another embodiment, the work piece 50 is made of material with micro holes or without micro holes that can be fixed by vacuum suction. In this embodiment, the sawing machine 20 includes a feed mechanism 21, a vacuum holding device 22 and a rotational saw bow device without rotary axis 10, in which the rotational saw bow device without rotary axis 10 is configured in the same manner shown in FIG. 7.

Figure 9:
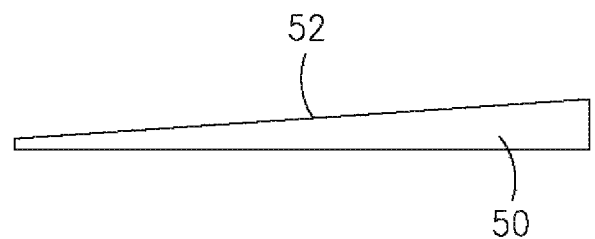
FIG. 9 is a schematic diagram showing a work piece after being sawed to form an oblique surface by the use of a rotational saw bow device of the present invention.

The rotational saw bow device 10 is connected to the feed mechanism 21. The feed mechanism 21 is provided for feeding a work piece 50. The vacuum holding device 22 is connected to the feed mechanism 21 to be used for fixedly holding the work piece 50. Using the aforesaid configuration, the rotational saw bow device 10 is used to rotate the saw bow seat 11 in the rotation direction by the same manner described in the foregoing embodiments so that the saw bow seat 11 is rotated with respect to the feed mechanism 21 and thus tilted by a specific angle, and thereby the saw blade 16 is tilted by a sawing angle as required. In FIG. 8, the saw bow seat 11 is rotated so as to enable the saw blade to have a 6-degree sawing angle, and then the feed mechanism 21 is activated for feeding the work piece 50 to move along the Z-coordinate toward the saw bow seat 11 so as to feed the work piece 50 to the saw blade 16 for cutting. Thereby, the work piece 50 is cut by the saw blade with 6-degree sawing angle so that an oblique surface 52 of the specific angle on the work piece 50 is achieved, as shown in FIG. 9. However, the present invention is not limited by the aforesaid embodiment, and thus in other embodiments, oblique surfaces of different tilt angles on the work piece 50 can be achieved according to the variation in the moving distance of the feed mechanism 21 along with operation of the saw blade with different tilt angles.

Figure 10:
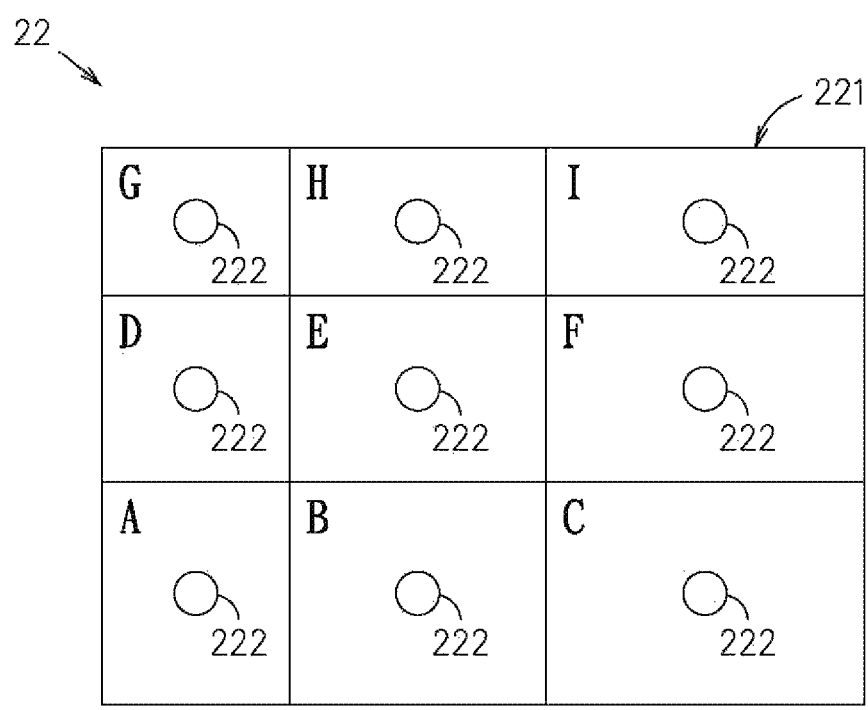
FIG. 10 is a schematic diagram showing a vacuum holding device using in the sawing machine of FIG. 8.
Figure 11A:
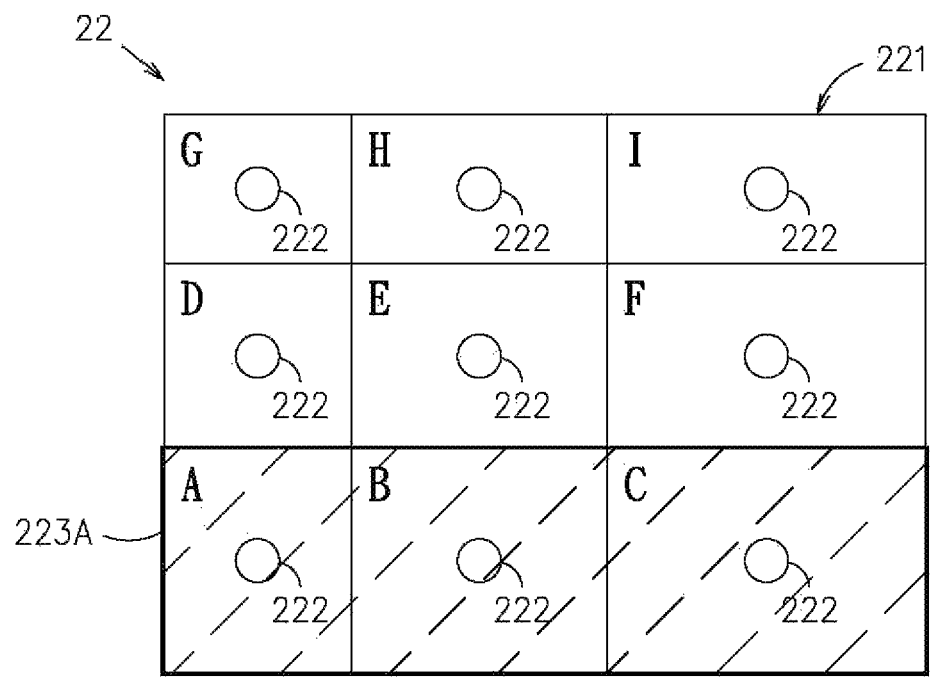
FIG. 11A is a schematic diagram showing a vacuum holding device according to a first embodiment of the present invention.
Figure 11B:
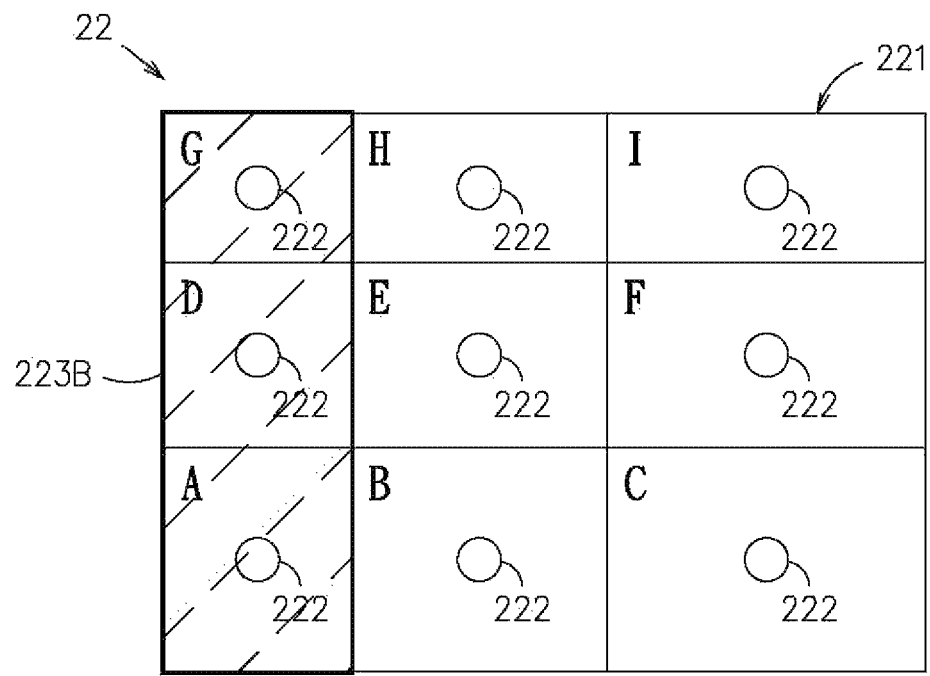
FIG. 11B is a schematic diagram showing a vacuum holding device according to a second embodiment of the present invention.
Figure 11C:
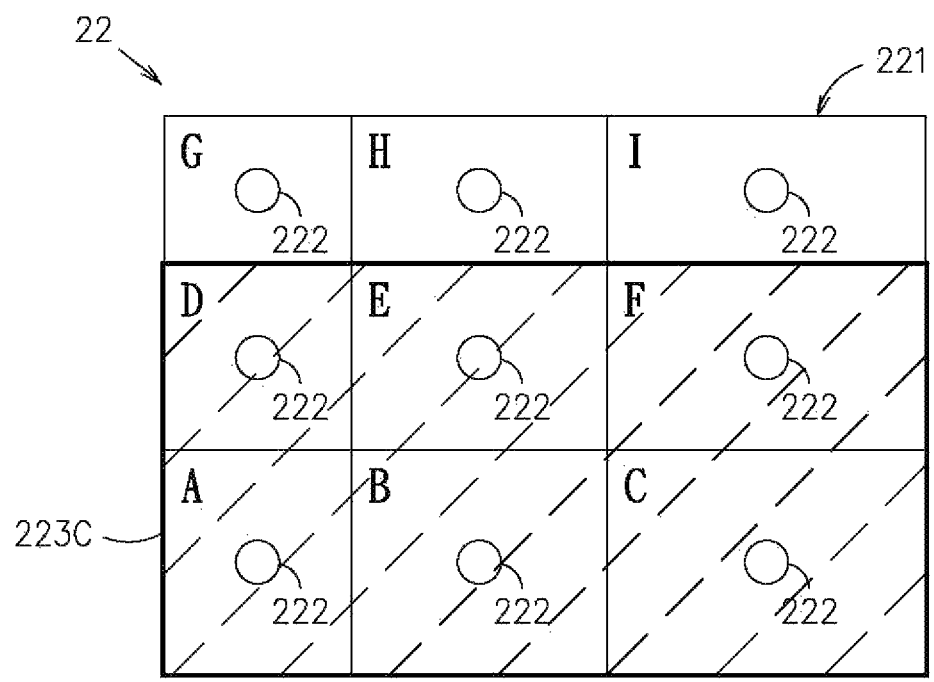
FIG. 11C is a schematic diagram showing a vacuum holding device according to a third embodiment of the present invention.
Figure 11D:
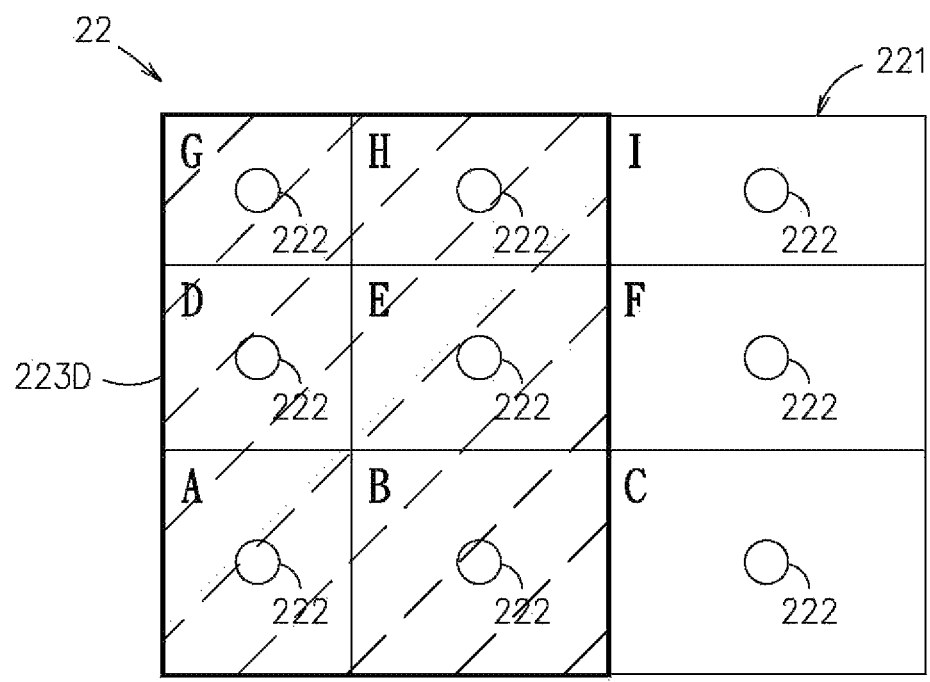
FIG. 11D is a schematic diagram showing a vacuum holding device according to a fourth embodiment of the present invention.
Figure 11E:
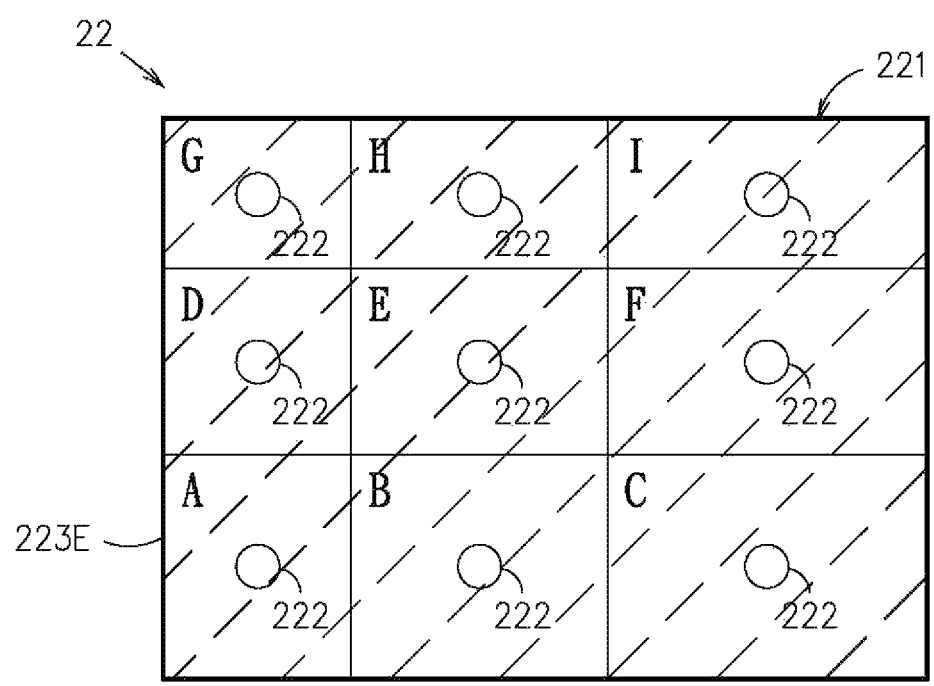
FIG. 11E is a schematic diagram showing a vacuum holding device according to a fifth embodiment of the present invention.

FIG. 10 is a schematic diagram showing a vacuum holding device using in the sawing machine of FIG. 8. FIG. 11A is a schematic diagram showing a vacuum holding device according to a first embodiment of the present invention. FIG. 11B is a schematic diagram showing a vacuum holding device according to a second embodiment of the present invention. FIG. 11C is a schematic diagram showing a vacuum holding device according to a third embodiment of the present invention. FIG. 11D is a schematic diagram showing a vacuum holding device according to a fourth embodiment of the present invention. FIG. 11E is a schematic diagram showing a vacuum holding device according to a fifth embodiment of the present invention. In FIG. 8 and FIG. 10, the disclosed embodiment is designed for a work piece 50 made of a soft material, while the work piece 50 is fixed by the use of a vacuum holding device 22. However, the present invention is not limited thereby, and thus in another embodiment, the work piece 50 can be made of a light-weight material; or further in another embodiment, the work piece 50 can be made of material with micro holes or without micro holes that can be fixed by vacuum suction. The vacuum holding device 22 in this embodiment further comprises: a holding platform 221, and a plurality of suction holes 222. The holding platform 221 is disposed on the feed mechanism 21, while the plural suction holes 222 are holes formed on different positions on the holding platform 221. As the 9 suction holes 222 shown in the present embodiment, they are formed respectively at the positions A~I on the holding platform 221, while enabling each of the plural suction holes 222 to be flow connected by a piping to a negative pressure source. Thereby, when the work piece 50 is being placed on the holding platform 221, the negative pressure source can be activated to provide a negative pressure via the plural suction holes 222 on the work piece 50 so as to fix the work piece 50 on the holding platform 221 by suction. As the conventional way for fixing the work piece 50 by the use of C-clamp is replaced by the aforesaid vacuum suction means, the problem of the soft work piece 50 can be deformed by the clamping force from the C-clamps is prevented. Thus, the present invention can be applied for cutting the work pieces made of soft materials. Nevertheless, in other embodiment, the work piece 50 can be made of a light-weight material which is especially advantageous for the vacuum holding device to fixedly holding the same; or further in another embodiment, the work piece 50 can be made of material with micro holes or without micro holes that can be fixed by vacuum suction.

In addition, considering there can be work pieces 50 of different sizes, the present invention responses by grouping the plural suction holes located at different positions into at least one suction area of various sizes for matching those work pieces 50 of different sizes. As shown in FIG. 11A, a first suction area 223A is achieved by activating and grouping the suction holes 222 located at position A, position B and position C on the holding platform 221. As shown in FIG. 11B, a second suction area 223B is achieved by activating and grouping the suction holes 222 located at position A, position D and position G on the holding platform 221. As shown in FIG. 11C, a third suction area 223C is achieved by activating and grouping the suction holes 222 located at position A, position B, position C, position D, position E and position F on the holding platform 221. As shown in FIG. 11D, a fourth suction area 223D is achieved by activating and grouping the suction holes 222 located at position A, position B, position D, position E, position G and position H on the holding platform 221. As shown in FIG. 11E, a fifth suction area 223E is achieved by activating and grouping the suction holes 222 located at position A, position B, position C, position D, position E, position F, position G, position H, and position I on the holding platform 221. However, the present invention is not limited by the aforesaid embodiments, and thus various suction areas can be formed as required. Thus, operationally, there can only be a portion of the plural suction holes 222 to be activated only if they can be grouped to form a suction area matching to the size of the work pieces 50 that are to be processed.

To sum up, in a rotational saw bow device without rotary axis and the sawing machine that are disclosed in the present invention, when the motor is enabled to drive the gear wheel portion to rotate on the angle adjustment portion while simultaneously enabling each rotating mechanism to move following the guiding of the trajectory portion so as to bring along the saw bow seat to rotate accordingly, the saw blade is being brought along to tilt by a specific angle, and then the feed mechanism is activated for feeding a work piece to the saw blade for cutting. Thereby, the work piece 50 cut by the tilted saw blade so that an oblique surface of the specific angle on the work piece is achieved.

Moreover, in the present embodiment as saw bow seat is rotated according to the moving of the rotating mechanisms on the trajectory portion that the saw bow seat in the present invention is not rotated about its rotation axis, the issue relating the overburdening on the axis can be prevented. In addition, since the plural follower bearings are enabled to slide on the trajectory portion respectively when the rotating mechanisms are enabled to move on the trajectory portion, the smoothness for enabling the saw bow seat 11 to rotate is enhanced.

In addition, as the conventional way for fixing a work piece by the use of C-clamp is replaced by the vacuum suction means of the present invention, the problem of the soft work piece can be deformed by the clamping force from the C-clamps is prevented. Thus, the present invention can be applied for cutting the work pieces made of soft materials. Nevertheless, in other embodiment, the work piece 50 can be made of a light-weight material which is especially advantageous for the vacuum holding device to fixedly holding the same; or further in another embodiment, the work piece 50 can be made of material with micro holes or without micro holes that can be fixed by vacuum suction. Furthermore, since there can only be a portion of the plural suction holes to be activated only if they can be grouped to form a suction area matching to the size of the work pieces that are to be processed, not only the operation convenience is enhanced, but also the it can prevent the cutting operation from being interfered by the unnecessary vacuuming.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A rotational saw bow device, comprising:
   a saw bow seat;
   a fixed portion, the fixed portion connected to the saw how seat; and
   a rotating device, the rotating device disposed at a position between the saw bow seat and the fixed portion, the rotating device comprising:
      an angle adjustment portion,
      a driving component including a gear wheel portion mated to the angle adjustment portion,
      a trajectory portion, and
      at least one rotating mechanism, wherein the driving component drives the gear wheel portion to rotate on the angle adjustment portion causing the at least one rotating mechanism and the saw bow seat to move together along the trajectory portion;
   wherein the at least one rotating mechanism includes an outer mounting panel and an inner mounting panel, the outer mounting panel and the inner mounting panel are rigidly connected to the saw bow seat and engage opposing sides of the trajectory portion; and
   wherein each of the outer mounting panel and the inner mounting panel comprises:
      a respective slot;
      a plurality of first follower bearings positioned at a periphery of the respective slot and engaging a first side of the opposing sides of the trajectory portion,
      a plurality of second follower bearings positioned at the periphery of the respective slot and engaging a second side of the opposing sides of the trajectory portion opposite the first side, and
      at least one third follower bearing positioned in the respective slot between the plurality of first follower bearings and the plurality of second follower bearings and engaging a third side of the trajectory portion orthogonally to the first side, the second side, the plurality of first follower bearings, and the plurality of second follower bearings.

2. The rotational saw bow device of claim 1, wherein the saw bow seat comprises a saw blade, the angle adjustment portion includes a first position and a second position, the gear wheel portion engages with the angle adjustment portion between the first position and the second position inclusively, such that the saw blade is tilted by a first angle when the gear wheel portion mates with the angle adjustment portion at the first position, and the saw blade is tilted by a second angle when the gear wheel portion mates with the angle adjustment portion at the second position.

3. The rotational saw bow device of claim 1, wherein each of the plurality of first follower bearings, the plurality of second follower bearings, and the at least one third follower bearing is slidably disposed on the trajectory portion.

4. The rotational saw bow device of claim 1, wherein the angle adjustment portion is an arc-shaped component.

5. The rotational saw bow device of claim 1, wherein the trajectory portion is an arc-shaped component.

6. The rotational saw bow device of claim 1, wherein the at least one rotating mechanism includes multiple rotating mechanisms that are alternatively arranged.

7. The rotational saw bow device of claim 1, wherein the driving component has a motor coupled to and driving the gear wheel portion.

8. The rotational saw bow device of claim 1, wherein the fixed portion further includes a driver and the saw bow seat further includes a sliding component engaging with the driver.

9. The rotational saw bow device of claim 1, wherein the outer mounting panel and the inner mounting panel of each respective rotating mechanism are connected to opposite sides of a respective bottom plate, the respective bottom plate rigidly connected to the saw bow seat.

10. A sawing machine for saw cutting a work piece, comprising:
   a work piece feeder, the work piece feeder feeding the work piece;
   a vacuum holding device, the vacuum holding device connected to the work piece feeder for fixedly holding the work piece;
   a rotational saw bow device, the rotational saw bow device connected to the work piece feeder, the rotational saw bow device comprising:
      a saw bow seat; and
      a fixed portion, the fixed portion connected to the saw bow seat; and
   a rotating device, the rotating device disposed at a position between the saw bow seat and the fixed portion, the rotating device having
      an angle adjustment portion,
      a driving component including a gear wheel portion mated to the angle adjustment portion,
      a trajectory portion, and
      at least one rotating mechanism, wherein the driving component rotates the gear wheel portion mated with the angle adjustment portion, and the at least one rotating mechanism and the saw bow seat move together along the trajectory portion;
   wherein the work piece feeder feeds the work piece towards the saw bow seat, orthogonally to a rotation of the rotating device;
   wherein each of the at least one rotating mechanism includes an outer mounting panel and an inner mounting panel, the outer mounting panel and the inner mounting panel are rigidly connected to the saw bow seat and engage opposing sides of the trajectory portion; and
   wherein each of the outer mounting panel and the inner mounting panel comprises:
      a respective slot;
      a plurality of first follower bearings positioned at a periphery of the respective skit and engaging a first side of the opposing sides of the trajectory portion,
      a plurality of second follower bearings positioned at the periphery of the respective slot and engaging a second side of the opposing sides of the trajectory portion opposite the first side, and
      at least one third follower bearing positioned in the respective slot between the plurality of first follower bearings and the plurality of second follower bearings and engaging a third side of the trajectory portion orthogonally to the first side, the second side, the plurality of first follower bearings, and the plurality of second follower bearings.

11. The sawing machine of claim 10, wherein the vacuum holding device further comprises: a holding platform, a plurality of suction holes, and at least one suction area in a manner that the plurality of suction holes are formed respectively piercing through the holding platform at different positions while allowing the plurality of suction holes at different positions to be grouped to form the at least one suction area.

12. The sawing machine of claim 10, wherein the outer mounting panel and the inner mounting panel of each respective rotating mechanism are connected to opposite sides of a respective bottom plate, the respective bottom plate rigidly connected to the saw bow seat.

\* \* \* \* \*